United States Patent [19]

Rosheim

[11] Patent Number: 4,686,866
[45] Date of Patent: Aug. 18, 1987

[54] COMPACT ROBOT WRIST ACUATOR

[76] Inventor: Mark E. Rosheim, 1565 St. Paul Ave., St. Paul, Minn. 55116

[21] Appl. No.: 820,678

[22] Filed: Jan. 21, 1986

[51] Int. Cl.$^4$ .......................................... G05G 11/00
[52] U.S. Cl. ................... 74/479; 74/655 A; 901/26; 901/29
[58] Field of Search ............... 74/479, 655 A; 901/14, 901/15, 16, 17, 18, 25, 26, 27, 28, 29

[56] References Cited

U.S. PATENT DOCUMENTS

| | | | |
|---|---|---|---|
| 3,246,580 | 4/1966 | Huska | 92/120 |
| 3,405,406 | 10/1968 | Vykukal | 2/2.1 |
| 3,631,737 | 1/1972 | Wells | 74/469 |
| 3,739,923 | 6/1973 | Totsuka | 214/1 |
| 3,784,031 | 1/1974 | Niitu et al. | 214/1 |
| 3,912,172 | 10/1975 | Bolner | 239/265.35 |
| 3,973,469 | 8/1976 | Humen | 91/51 |
| 4,009,644 | 3/1977 | Higuichi et al. | 92/125 |
| 4,045,958 | 9/1977 | Wells | 60/325 |
| 4,046,262 | 9/1977 | Vykukal et al. | 214/1 |
| 4,068,536 | 1/1978 | Stackhouse | 74/417 |
| 4,107,948 | 8/1978 | Molaug | 64/2 |
| 4,194,437 | 3/1980 | Rosheim | 92/120 |
| 4,296,681 | 10/1981 | Rosheim | 92/122 |
| 4,353,677 | 10/1982 | Susnjara et al. | 414/735 |
| 4,574,655 | 3/1986 | Kimura et al. | 901/29 X |
| 4,608,884 | 9/1986 | Beyer | 901/29 X |

FOREIGN PATENT DOCUMENTS

| | | | |
|---|---|---|---|
| 106561 | 4/1984 | European Pat. Off. | 901/29 |
| 2752236 | 7/1980 | Fed. Rep. of Germany . | |
| 598749 | 3/1978 | U.S.S.R. | 901/26 |
| 704777 | 12/1979 | U.S.S.R. | 901/29 |

OTHER PUBLICATIONS

"Robot Wrist Actuators," *Robotics Age*, Nov./Dec. 1982, pp. 15-22.
*Pictorial Handbook of Technical Devices*, by Pete Grafstein & O. Schwarz, published by the Chemical Publishing Company, Inc. of New York, pp. 16-17, 1971.

*Primary Examiner*—Dave W. Arola
*Attorney, Agent, or Firm*—Kinney & Lange

[57] ABSTRACT

A present invention is a robot wrist actuator including a mechanical joint having a housing. First and second gimbal assemblies are rotatably mounted to the interior of the housing to provide pitch and yaw movement. A collar is rotatably attached to the housing. A drive mechanism is connected to the second gimbal assembly to provide roll movement. An output shaft for tool attachment is connected to the first gimbal assembly. A drive assembly preferably including linearly-actuated rods provides motive force for movement of the first and second gimbal assemblies.

23 Claims, 13 Drawing Figures

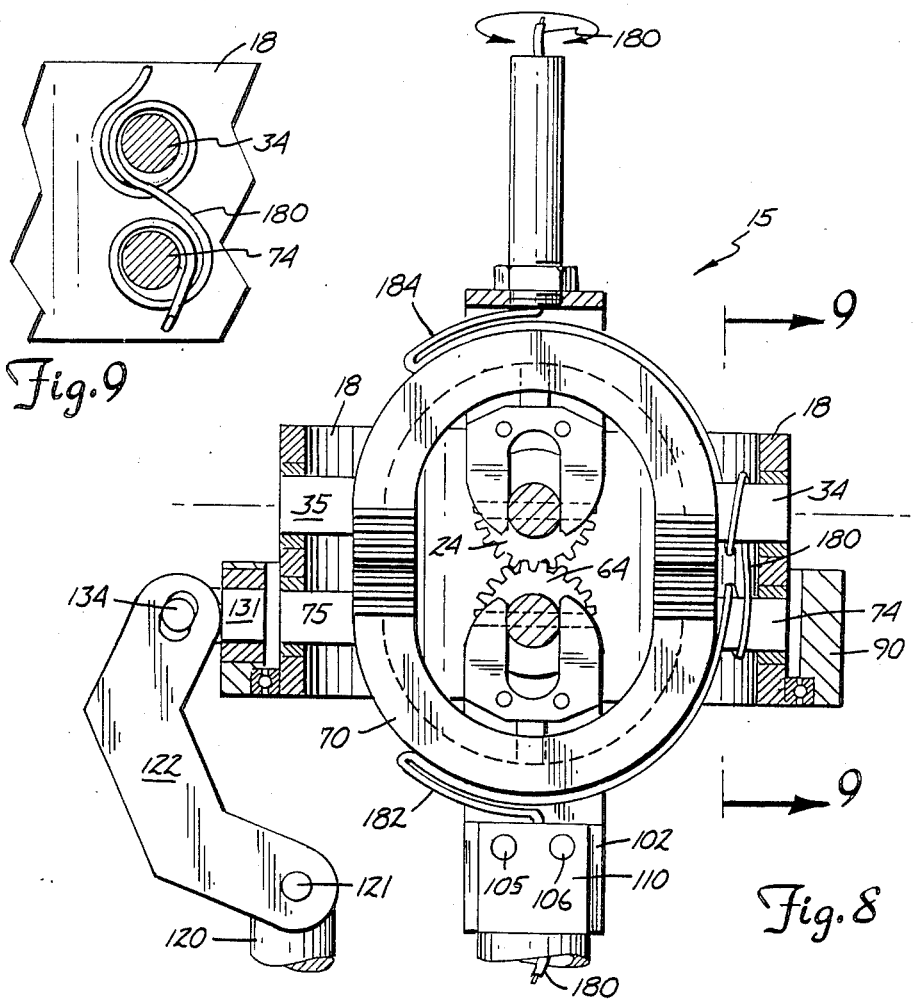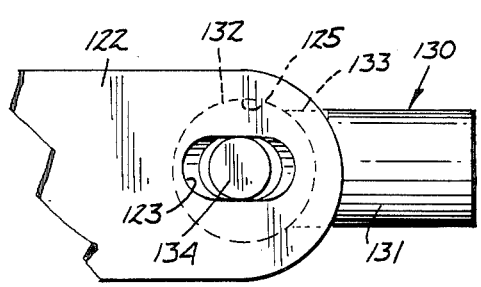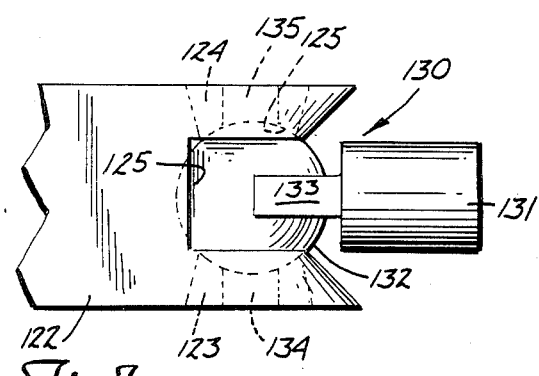

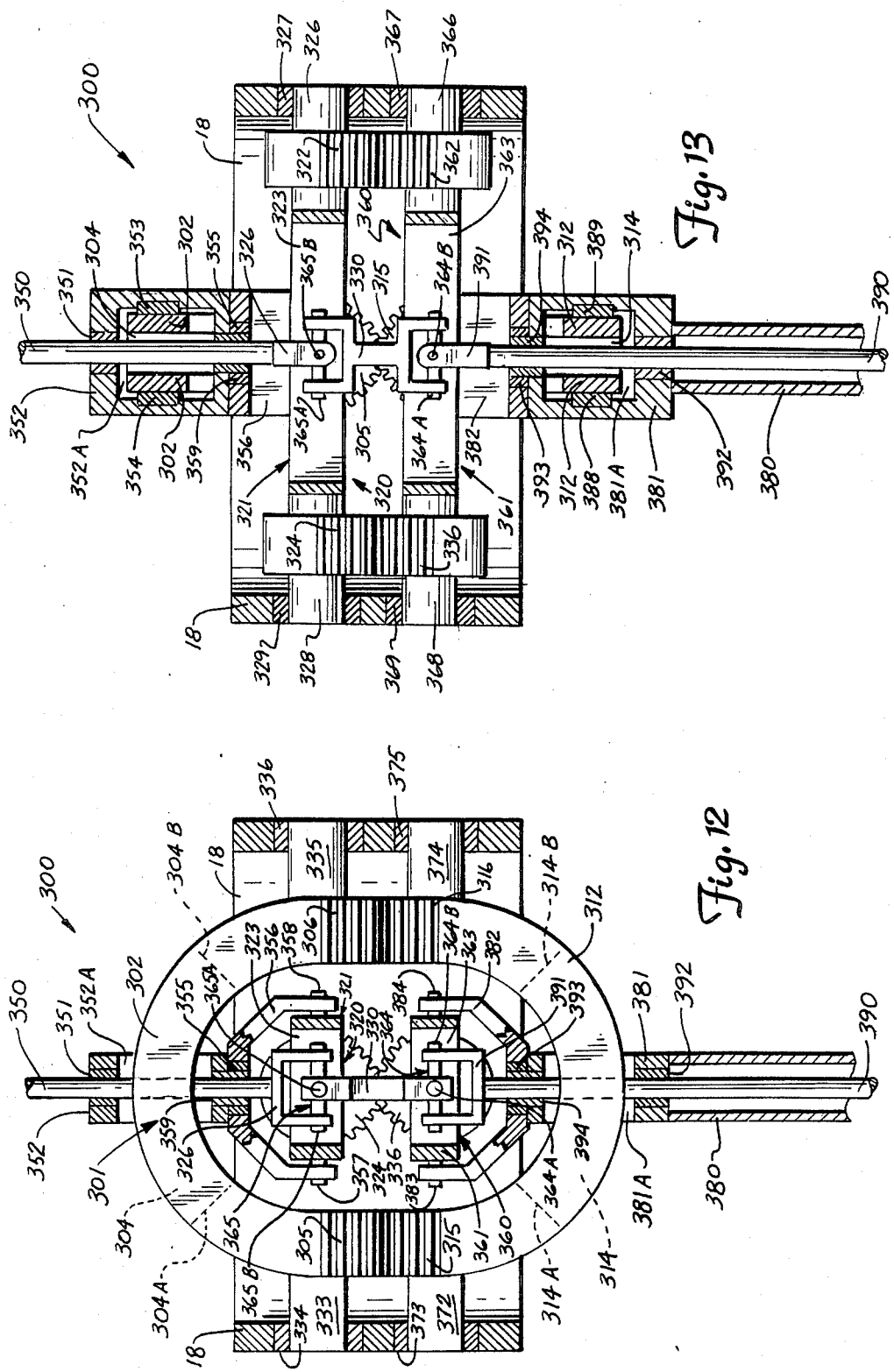

COMPACT ROBOT WRIST ACUATOR

BACKGROUND OF THE INVENTION

1. Field of the Invention

The present invention relates to mechanical joints and robot wrists and in particular relates to a compact robot wrist having simultaneous pitch-roll-yaw movement.

2. Description of the Prior Art

Interest in robotics and the use of robots in industrial applications has greatly increased in recent years. One area in which the use of robots has become important is the replacement of humans in tasks that involve manual work, such as welding, material handling, paint spraying, and assembly. Many of these tasks require working in cramped spaces or performing complex maneuvers. To perform such tasks, a robot arm or wrist should be able to rotationally move in a range similar to a human wrist and at a dwell time acceptable for the particular task involved.

One article reviewing the development of robot arms and wrists is entitled, "Robot Wrist Actuators," *Robotics Age*, November/December 1982, pp. 15–22, and was written by the applicant of the present application. In the article, several characteristics are described that make robot wrists attractive. One characteristic is that a mechanical arm or wrist can be safely used in areas where there is a danger of explosion if the wrist is driven by hydraulic actuators. However, there are several disadvantages with the prior art robot arms and wrists. Some of the disadvantages are also enumerated in the above-mentioned article and include large and bulky mechanical joints, slow dwell time in some rotational directions and low mechanical efficiency.

A number of well known universal joints are illustrated and described on pages 16 and 17 of the *Pictorial Handbook of Technical Devices* by Pete Grafstein and O. Schwartz, published by the Chemical Publishing Company, Inc. of New York, 1971. Although rotational motion can be transmitted through the universal joints illustrated on pages 16 and 17, the universal joints cannot be used in operations for transmitting pitch, yaw and roll motion to an implement or tool member.

A rotary actuator mechanism is described in the Higuchi et al U.S. Pat. No. 4,009,644. However, the rotary actuator of the Higuchi et al Patent is not very useful for the transmission of pitch, yaw and roll motion to a tool or implement member.

A number of robot joints are illustrated in the Vykukal U.S. Pat. No. 3,405,406 and the Vykukal et al U.S. Pat. No. 4,046,262. The Vykukal patents describe hard-type space suis that permit the user inside the space suit to move around somewhat unrestricted.

The Bolner U.S. Pat. No. 3,912,172, describes a back-drivable, direct drive, hydraulically-actuated pitch and roll actuator.

The Rosheim U.S. Pat. Nos. 4,194,437 and 4,296,681, which were issued to the applicant of the present application, describe hydraulic servomechanisms which impart rotary movements to a device to be driven.

The Stackhouse U.S. Pat. No. 4,068,536 describes a remotely-driven, mechanical manipulator. The manipulator is controlled by three concentric drive shafts which terminate in a spherically-spaced wrist mechanism.

The Totsuka U.S. Pat. No. 3,739,923 and the Niitu et al U.S. Pat. No. 3,784,031 describe a manipulator arm having two parallel rotating drive shafts in a beveled gear system which translates the drive shaft's rotating motion to a bending pitch motion and rotary roll motion in a tool member.

A mechanical wrist is described in German Pat. No. 2,752,236 that includes three electric motors, providing pitch, yaw, and roll, which are mounted on the outside of a housing with the inside of the housing being hollow. The wrist is used for holding welding tongs and the hollow inside housing permits electrical power lines to be fed through the wrist.

The Molaug U.S. Pat. No. 4,107,948 describes a flexible robot arm that is composed of a number of mutually connected rigid links being connected at one end to a drive means and at the other end to a tool member that is to be rotated. Another robot arm is illustrated in the Wells U.S. Pat. No. 3,631,737. The robot arm of the Wells Patent includes a plurality of rigid tubular sections joined end-to-end by flexible joints to form an articulated arm. The rigid sections are manipulated by slender control cables which are attached to the restrictive sections and selectively extend and retract.

SUMMARY OF THE INVENTION

The present invention includes a robot wrist actuator having a mechanical joint for simultaneous pitch, yaw and roll movement. The wrist actuator includes a mechanical joint that provides singularity-free motion, high precision and back-driveability. The mechanical joint simulates the range of movement of the human wrist and has a relatively few number of parts.

The mechanical joint of the present invention includes a cylindrical housing open at both a top and a bottom end. First and second gimbal assemblies for pitch and yaw movement are rotatably mounted to the interior of the housing. A collar is rotatably decoupled to the outer circumference of the housing. A drive shaft is connected to the second gimbal assembly to provide roll movement. An output shaft for tool attachment is connected to the first gimbal assembly. A drive assembly provides motive force for pivoting the first and second gimbal assemblies. In a preferred embodiment, the drive asesmbly includes linearly activated rods.

In a first alternative embodiment, chains are substituted for linearly-actuated rods to provide the motive force for the first and second gimbals. In a second alternate embodiment, an additional roll axis is added to provide a robot wrist with pitch-yaw-roll-roll movement.

BRIEF DESCRIPTION OF THE DRAWINGS

FIG. 6 is a detail side view showing the ball joint assembly between the links and the collar.

FIG. 7 is a detail top view of FIG. 6.

FIG. 8 is a sectional view of the apparatus of FIG. 1 illustrating an electrical conduit path.

FIG. 9 is a sectional view taken along line 8—8 of FIG. 8.

FIG. 12 is a sectional view of an alternate embodiment of the present invention illustrating an additional roll axis.

FIG. 13 is a sectional view of the apparatus of FIG. 12 rotated 90° from the view of FIG. 12.

DETAILED DESCRIPTION OF THE PREFERRED EMBODIMENTS

Figure 1:
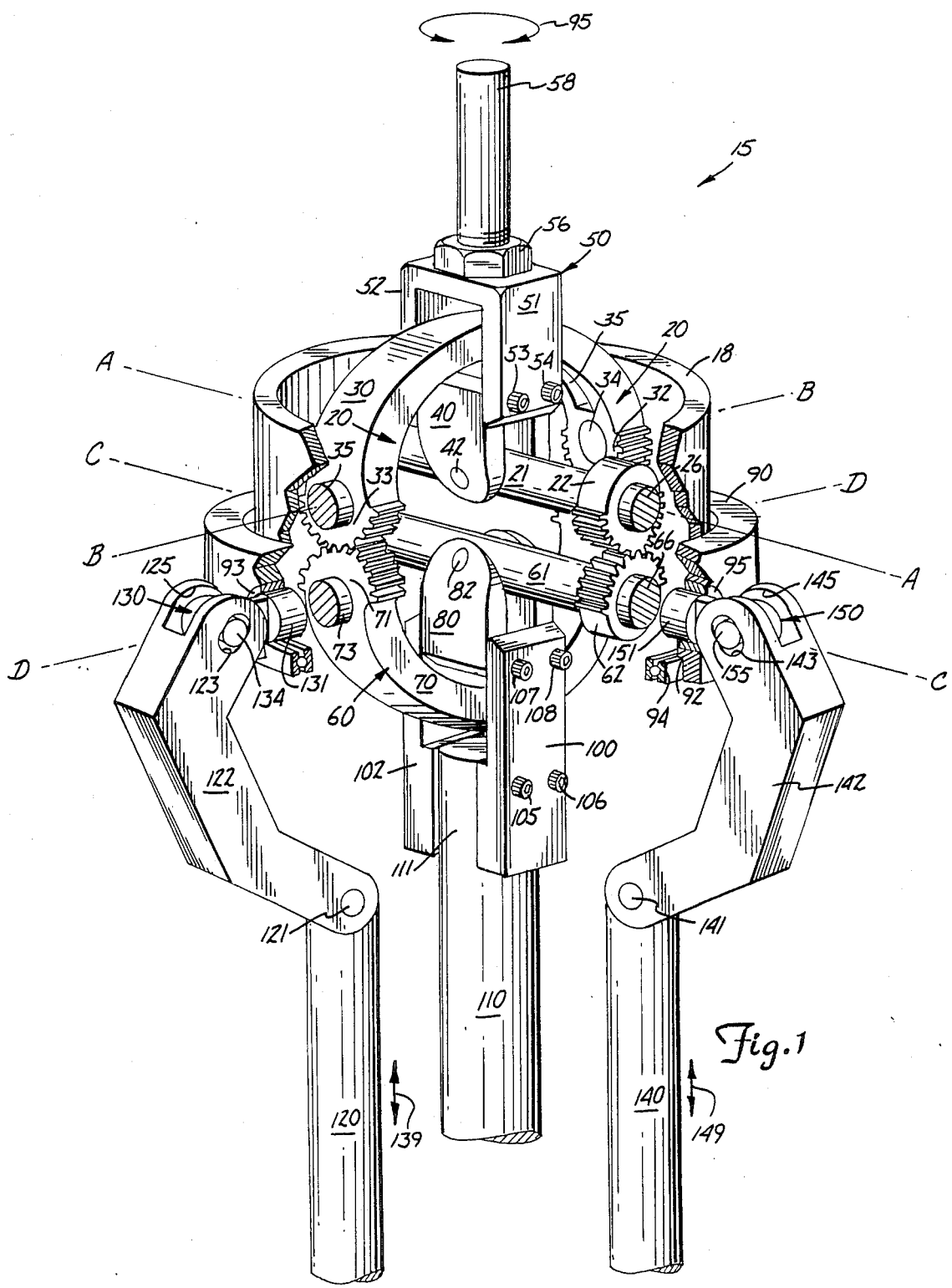
FIG. 1 is a perspective view of the apparatus of the present invention with portions broken away for clarity.

The robot wrist actuator of the present invention is generally indicated at 15 in FIG. 1. Throughout the figures and embodiments, like reference characters will be used to indicate like elements. The robot wrist actuator 15 includes a first or forward gimbal assembly 20 and a second or rearward gimbal assembly 60 disposed preferably within a housing 18. The housing 18 is preferably a cylindrical wall with both ends open.

Figure 4:
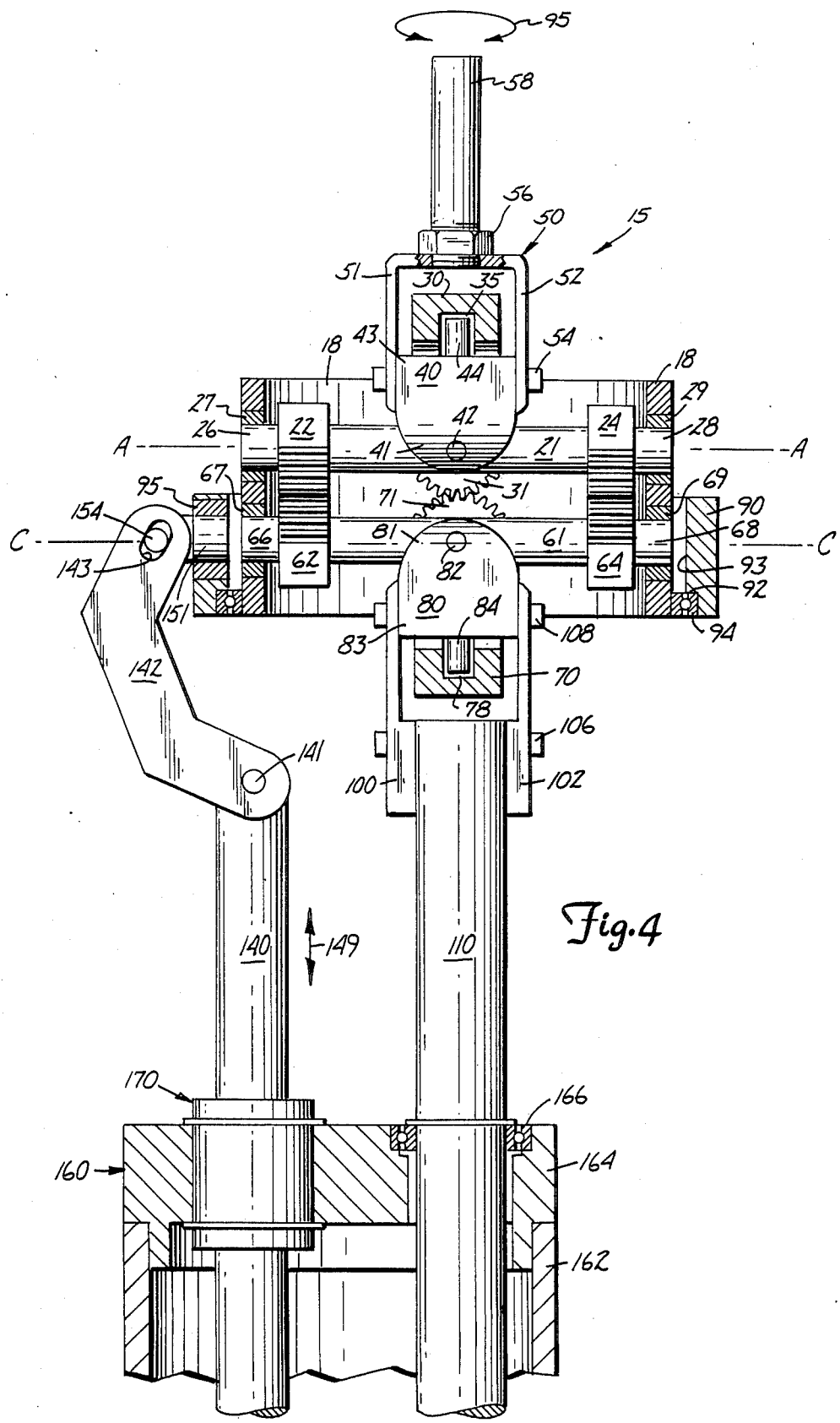
FIG. 4 is a sectional view of the apparatus of FIG. 1 rotated 90° from the view of FIG. 2.
Figure 5:
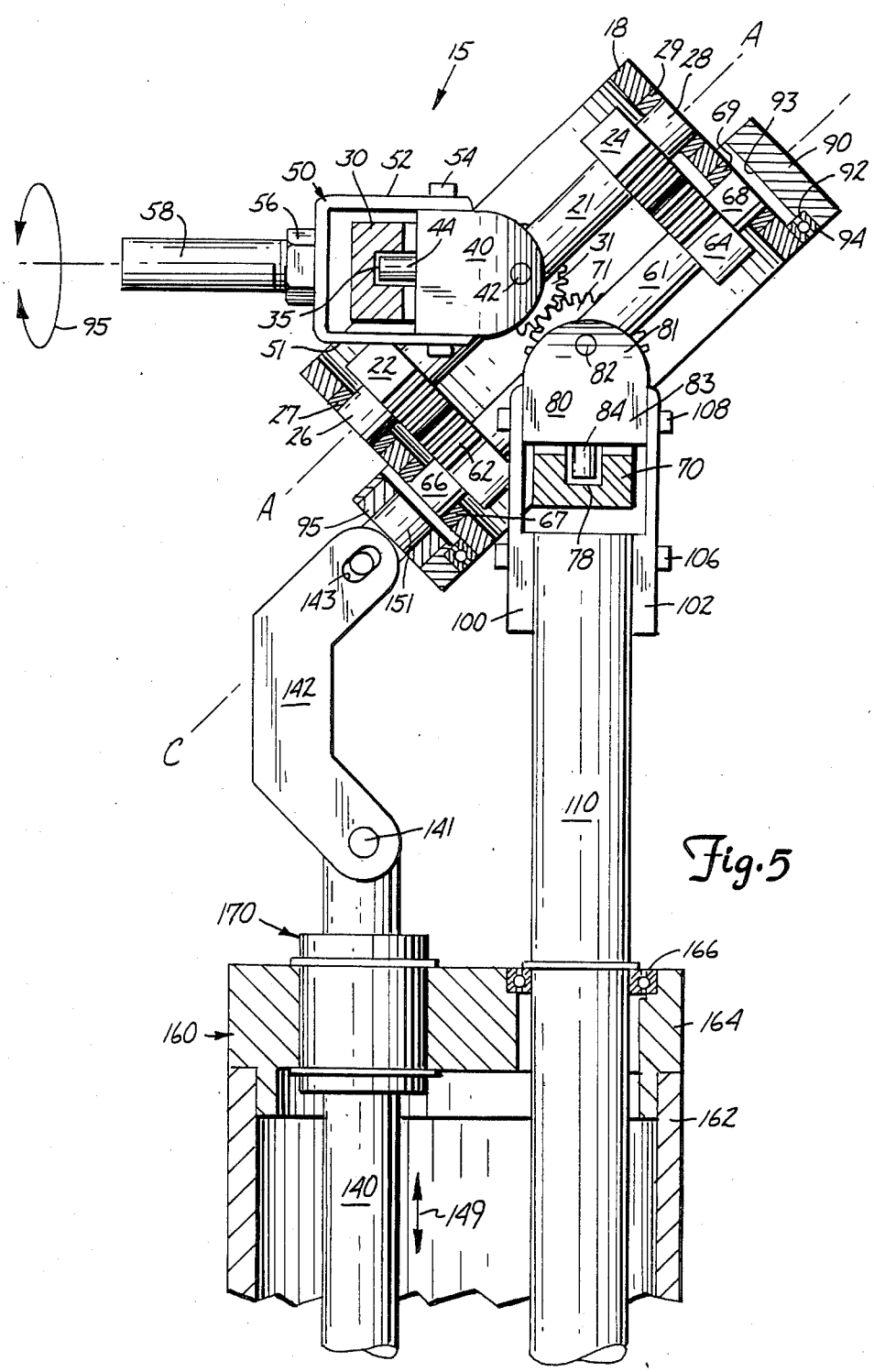
FIG. 5 is a sectional view showing the pitch axis extended.

The first gimbal assembly 20 includes a first or forward shaft 21 and a first or forward bail 30. The shaft 21 and the bail 30 are aligned perpendicularly with respect to each other. A pair of gears 22 and 24 (preferably spur gears) are fixedly mounted on opposite ends of the shaft 21. Stubs 26 and 28 of the shaft 21 extend beyond the gears 22 and 24, respectively, and are mounted in the housing 18 coaxially with a longitudinal axis A of the shaft 21. As can be seen in FIGS. 4 and 5, the stubs 26 and 28 are mounted to the housing with bushings 27 and 29, respectively. When mounted in the housing 18, shaft 21 rotates about axis A with respect to the housing 18.

Figure 2:
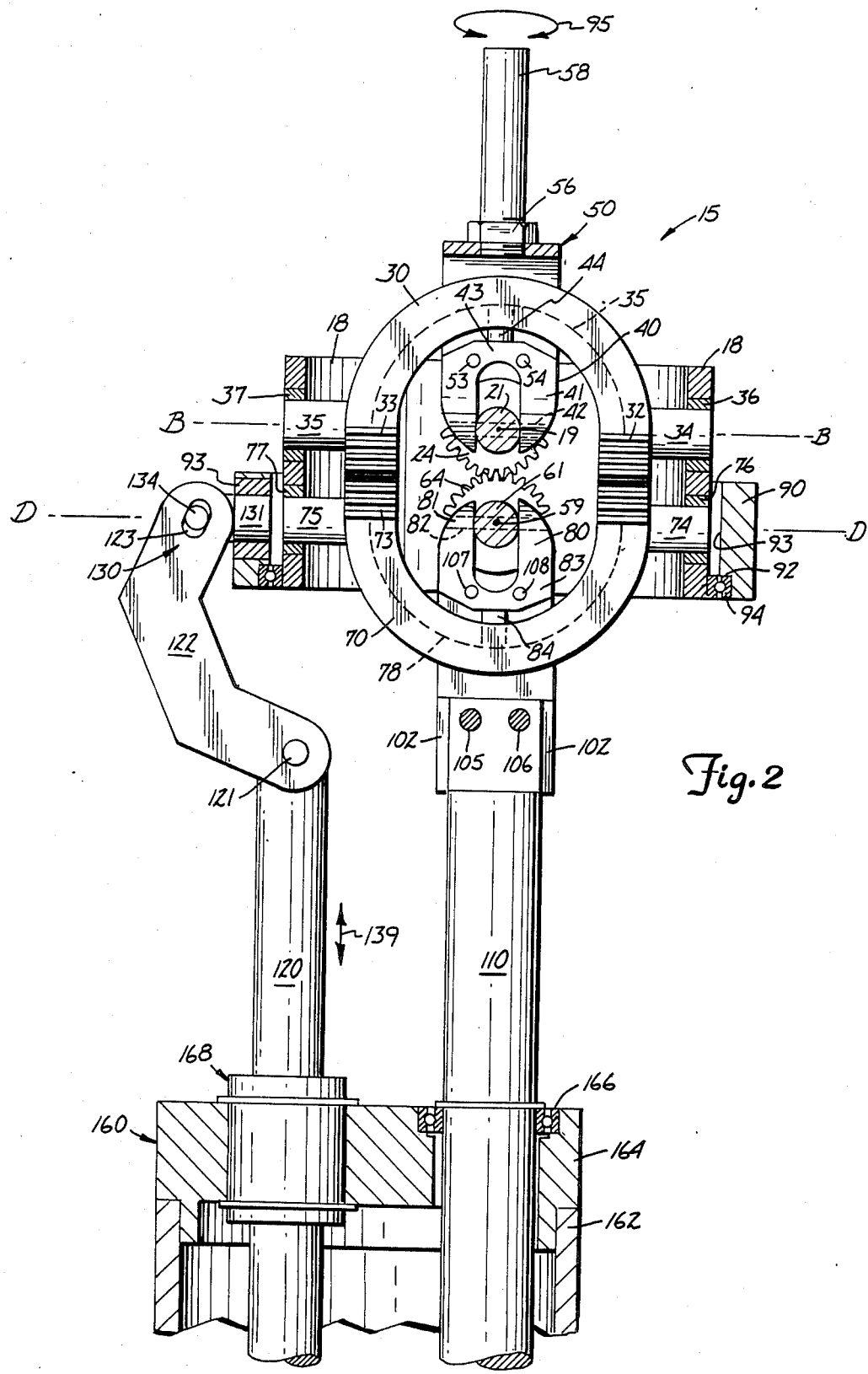
FIG. 2 is a sectional view of the apparatus of FIG. 1 illustrating the gimbal assemblies.
Figure 3:
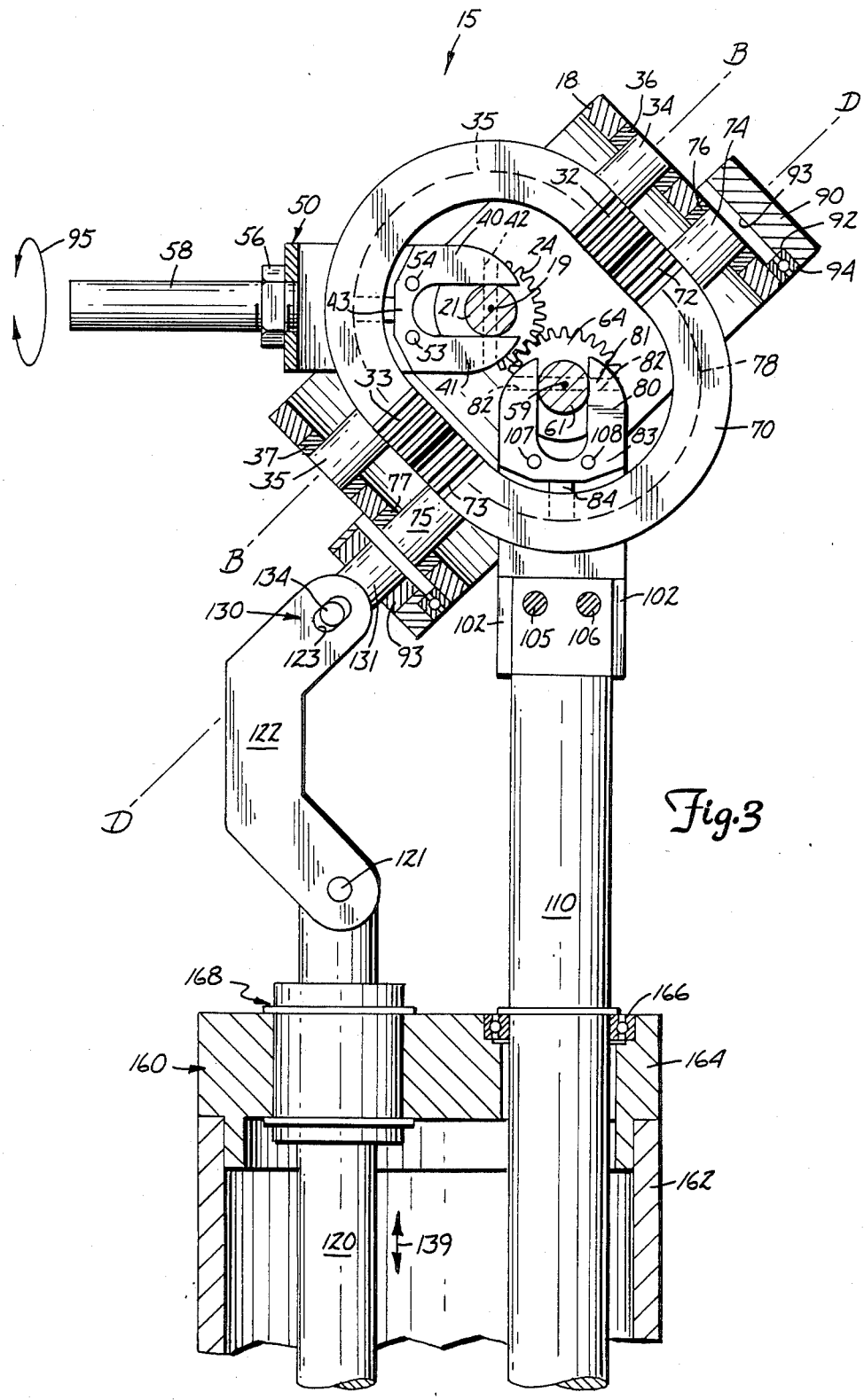
FIG. 3 is a sectional view of the apparatus of FIG. 1 illustrating the yaw axis extended.

As illustrated best in FIGS. 2 and 3, the bail 30 is generally arcuate and is curved inwardly into the housing 18. The bail 30 terminates in a pair of gear portions 32 and 33 (preferably spur gears). As can be seen in FIG. 1 and represented by a phantom line in FIGS. 2 and 3, a groove is 35 provided in the inner surface of the bail 30 between the gear portions 32 and 33. As shown in FIGS. 2 and 3, pivot pins 34 and 35 are press fitted into respective openings near the centers of gears 32 and 33 and are coaxially disposed with axis B. Axis B is perpendicular to and coplanar with axis A. The intersection of axes A and B define a center point 19 of the first gimbal assembly 20, as illustrated in FIG. 2. Pins 34 and 35 are mounted within bushings 36 and 37 respectively. Bail 30 pivots about pins 33 and 34 with respect to the housing 18.

A first or forward clevis 40 is pivotally connected at an end portion 41 to the shaft 21 by a pin 42. The pin 42 pases through the center point 19 of the first gimbal assembly 20. As shown in FIGS. 2, 3, 4 and 5, a cam follower 44, provided at an end portion 43 of the clevis 40 opposite end portion 41, is inserted in the groove 35 of the bail 30. The cam follower 44 slides within the groove 35 during rotation of the wrist actuator 15.

A first or forward yoke 50 is fixedly connected to clevis 40 by pin fasteners 53 and 54. Bail 30 passes between the stems 51 and 52 of the yoke 50.

An output shaft 58 is secured by a nut 56 to the yoke 50. THe shaft 58 of the drawings is representative of any desired tool output configuration, including disks, grippers, probes, and the like. It is to be understood that the output shaft 58 can be integral with the yoke 50.

A second gimbal assembly 60 is provided opposite the first gimbal assembly 20 within the housing 18. In a manner similar to the first gimbal assembly 20, the second gimbal assembly 60 includes a second or rearward shaft 61 and a second or rearward bail 70. Shaft 61 is mounted along an axis C parallel to the axis A of the shaft 21. A pair of gears 62 and 64 (preferably spur gears) are fixedly mounted on opposite ends of shaft 61. The gears 62 and 64 mate with gears 22 and 24, respectively. As illustrated in FIGS. 4 and 5, stubs 66 and 68 extend beyond gears 62 and 64, respectively, and are mounted coaxially with the axis C in the housing 18. The stubs 66 and 68 are mounted within bushings 67 and 69, respectively. When mounted in the housing 18, shaft 61 rotates about the axis C and with respect to the housing 18. The gears 62 and 64 of shaft 61 by cooperation with the gears 22 and 24, respectively, of shaft 21, transmit rotation of one shaft to the other shaft to provide pitch rotation of the wrist actuator 15. It is preferred that gears 62 and 64 be slightly out of phase with gears 22 and 24, respectively. Due to the high mechanical efficiency of the spur gears 62, 64, 22 and 24, an out of phase relationship eliminates backlash while introducing only minimal friction.

The second bail 70 terminates in a pair of gears portions 72 and 73 (preferably spur gears). Pivot pins 74 and 75 are press fitted into openings near the centers of the gears portions 72 and 73 and are disposed coaxially with axis D. The axis D lies perpendicularly to and is coplanar with the axis C. The intersection of axes C and D define a center point 59 of the second gimbal assembly 60. The pivot pins 74 and 75 are received by bushings 76 and 77 respectively. Represented by a phantom line in FIGS. 2 and 3, a groove 78 is provided along the inner surface of the bail 70 between the gear portions 74 and 75. When mounted within the housing 18, the gears 72 and 73 mate with the gears 32 and 33, respectively, to provide a yaw rotation of the wrist actuator 15. It is preferred that gears 72 and 73 be slightly out of phase with gears 32 and 33, respectively. Due to the high mechanical efficiency of the spur gears 72, 73, 32 and 33, an out of phase relationship eliminates backlash while introducing only minimal friction.

A second or rearward clevis 80 is pivotally connected at an end portion 81 to the rearward shaft 61 by a pin 82. The pin 82 passes through the center point 59 of the second gimbal assembly 60. As shown in FIGS. 2, 3, 4 and 5, a cam follower 84, provided at the end portion 83 of the clevis 80 opposite end portion 81, is inserted in the groove 78 of the rearward bail 70. The cam follower 84 slides within the groove 78 during rotation of the wrist actuator 15.

A collar 90, preferably configured as a cylindrical ring, is rotatably connected to the housing 18. A ring bearing 94 is press fitted between an annular shoulder 92 on an inner surface 93 of the collar 90 and the housing 12. The ring bearing 94 decouples the collar 90 from the housing 18 and permits rotation of the housing 18 within the collar 90 in two directions as illustrated by arrows 95.

A drive shaft 110 is connected to the second gimbal assembly 60 to provide roll to the wrist actuator 15. The shaft 110 has an upper end 111. The end 111 is cut and formed to receive first and second bridge members 100 and 102. The first bridge member 100 is placed along one side of the upper end 111 of the drive shaft 110. The second bridge member 102 is placed on an opposite side of the shaft 110. Pins 105 and 106 fixedly connect the bridge members 100 and 102 to the shaft 110. Pins 107 and 108 fixedly connect the bridge members 100 and 102 to the clevis 80 of the second gimbal assembly 60. Any rotational movement in drive shaft 110 is transmitted through bridge members 100 and 102 to the clevis 80. From the clevis 80, rotational movement is transmitted through pivot pin 82 to shaft 61, and continues through stubs 66 and 68 to the housing 18. The ring bearing 94 allows the housing 18 to rotate within the collar 90. Bidirectional rotation of the drive shaft 110 results in bidirectional rotation of the housing 12. Rotation of the housing 12 results in rotation of the first gimbal assembly 20, thereby resulting in rotation of the output shaft 58. Thus, rotation of drive support shaft 110 is transmitted through the first and second gimbal assemblies 20 and 60 to the output shaft 58.

Pitch and yaw movements of the output shaft 58 are possible simultaneously with roll movement. A push-/pull rod 120 is pivotally connected to a link 122 by a pivot pin 121 as illustrated in FIGS. 1, 2 and 3. A ball joint assembly 130 pivotally connects the link 122 to the collar 90. A detailed view of the ball joint assembly 130 is shown in FIGS. 6 and 7. A cylindrical plug 131 is connected to a ball member 132 by a connecting member 133. The ball member 132 includes a pair of pins 134 and 135 projecting outwardly from the surface of the ball member 132 and perpendicular to a longitudinal axis of the plug 131. The link 122 has a chamber 123 which receives the ball member 132. The link 122 has slots 123 and 124 communicating with the chamber 123. The pins 134 and 135 extend into the slots 123 and 124, respectively. The plug 131 is rotatably mounted within a bushing 93 on the outer surface of the collar 90, as illustrated in FIGS. 1, 2 and 3. The plug 131 is coaxially disposed with respect to the axis D. Movement of push-/pull rod 120 in the general direction of arrows 139 causes rotational movement between gears 22 and 24 and gears 62 and 64, respectively, resulting in yaw rotation of the wrist actuator 15 as best illustrated by referring between FIGS. 2 and 3.

A push/pull rod 140 is pivotally connected to a link 142 by a pivot pin 141 as illustrated in FIGS. 1, 4 and 5. A ball joint assembly 150 pivotally connects the link 142 to the collar 90. The ball joint assembly 150 is similar in arrangement as ball joint assembly 130. A plug 151 is received within a bushing 95 on the outer surface of the collar 90. A pair of pivot pins 154 and 155 extending from a ball member (not shown) extend into complementary slots 143 and 144, respectively in the link 142. The plug 151 is disposed coaxially with the axis C. Movement of the push/pull rod 140 in the general direction of arrows 149 results in rotational movement between gears 32 and 33 and gears 72 and 73, respectively, resulting in pitch rotation of the wrist actuator 15 as best illustrated by referring between FIGS. 4 and 5.

The wrist actuator 15 of the present invention provides pitch, yaw and roll movement simultaneously. The wrist actuator 15 provides up to about 180° of pitch and yaw motion for the output shaft 58 about a central point lying halfway between the center points 19 and 59 of the first and second gimbal assemblies 20 and 60. The drive shaft 110 is bidirectionally rotatable 360° simultaneous with pitch and/or yaw motion. As is understood from the above, the wrist actuator 15 of the present invention provides a new form of constant velocity universal joint.

FIGS. 2, 3, 4 and 5 illustrate the drive shaft 110 and the push/pull rods 120 and 140 mounted in a known section of robot arm 160. A cylindrical wall 162 includes an end cap 164 for receiving the drive 110 and the rods 120 and 140. Drive shaft 110 is rotated within a ring bearing 166. As illustrated in FIGS. 2 and 3, the rod 120 is slidable within a bushing assembly 168. As illustrated in FIGS. 4 and 5, the rod 140 is slidable within a bushing assembly 170.

The open design of the wrist actuator 15 of the present invention permits routing of cables, electrical conduit, electrically conductive tape and the like through the wrist. For example, in FIG. 8, a flexible electrical wire 180 is shown routed through the wrist actuator 15. The wire 180 can be routed internally through the drive shaft 110 to the output shaft 58. In a preferred arrangement, the wire 180 is looped beneath bail 70 to form a first supply portion 182. Next, the wire 180 is loosely wrapped around pivot pins 74 and 34, as illustrated in FIGS. 8 and 9. The wire 180 is then looped above bail 30 to form a second supply portion 184 and then routed internally through the output shaft 58. The supply portions 182 and 184 permit yaw movement about gears 24 and 64. The example of wire routing illustrated in FIGS. 8 and 9 does not restrict pitch, yaw or roll movement of the actuator 15. It is to be understood that other wire paths are included within the present invention.

The wrist 15 of the present invention is operable through the use of alternative drive assemblies. An alternative drive assembly is generally indicated at 190 in FIG. 10. The drive assembly 190 includes a first chain 200 passing through openings 230 and 232 in a support 210. The chain 200 cooperates with a sprocket 206 that is fixedly attached to an output shaft 207. The sprocket 206 and the output shaft 207 are preferably within the support 210. The chain 200 includes two end portions 201 and 203 which are pivotally attached to links 204 and 202, respectively, to the collar 90. A first motor 205 provides a mode of force to the output shaft 207, which in turn provides movement to the chain 200. Movement of the chain 200 actuates pitch movement of the wrist actuator.

Figures 10, 11:
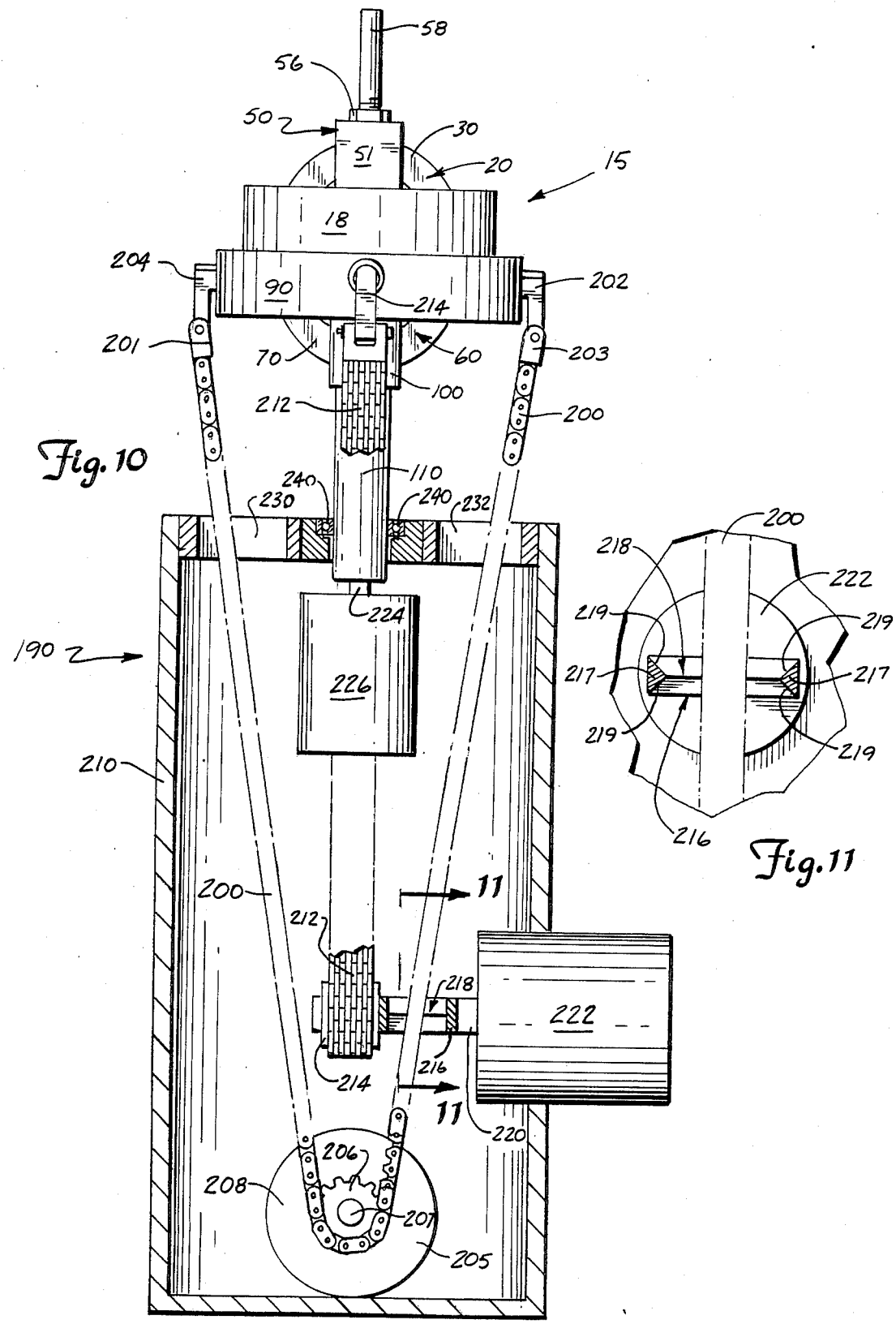
FIG. 10 is a view of the apparatus of FIG. 1 illustrating an alternative means for actuating pitch and yaw movement.
FIG. 11 is a sectional view taken along line 11—11 of FIG. 10.

A second chain 212 is connected to the collar 90 by link 214 and a corresponding link (not shown) 180° around the circumference of the collar 90 in a like manner as the chain 200. The chain 212 engages a sprocket 214. The sprocket 214 is connected to an output shaft 220 of a second motor 222 by a slotted coupling 216. The slotted coupling 216 includes an opening 218. The first chain 200 passes through the opening 218. The opening 218, as illustrated in FIG. 11 has oppositely facing side walls 217. The side walls 217 contain inner wall surfaces 219 which are disposed angularly, each wall surface 219 extending from an outer edge of the coupling inwardly at an angle to join an adjacent wall surface 219. The angularly disposed inner wall surfaces 219 provide an increased degree of movement of the coupling 216 without engaging the chain 200 and thus providing greater latitude for movement of the chain 212.

The drive shaft 110 of the wrist actuator 15 is rotatable mounted by a ring bearing 240 to the support 210. An output shaft 224 of a third motor 226 is connected to the drive shaft 110 to provide roll movement for the wrist actuator. It is preferred that motors 208, 222 and 226 be bidirectional.

An alternate embodiment 300 of the wrist actuator includes an additional roll axis and is illustrated in FIGS. 12 and 13. The alternate embodiment 300, having a pitch-yaw-first roll-second roll motion, utilizes the same cylindrical housing 18, as illustrated in FIGS. 1, 2, 3, 4 and 5. The housing 18 is to be actutated with the same collar 90, ring bearing 94 and push/pull rods 120 and 140 as described above and illustrated in FIGS. 1, 2, 3, 4 and 5. The collar 90, ring bearing 94 and push/pull rods 120 and 140 are not shown in FIGS. 12 and 13 since each has been previously described.

A first gimbal assembly 301 and a second gimbal assembly 310 are rotatably mounted within the interior portion of the housing 18 and are similar in construction to the first and second gimbal assembies 20 and 60, previously described.

The first or forward gimbal assembly 301 includes an arcuate bail 302 having pivot pins 333 and 335 and a slotted shaft 320 having pivot pins 326 and 328. The pivot pins 333 and 335 of the bail 302 are press fitted into openings near the ends of the bail 302. The pins 333 and 335 may be formed as an integral part of the bail 302 if desired. Bushings 334 and 336 are mounted within the housing 18. The pins 333 and 335 are mounted within the bushings 334 and 336, respectively to permit movement of the bail 302 with respect to the housing 18. The bail 302 terminates in a pair of gear portions 305 and 306 which are preferably spur gear portions. A slot 304 extends through the central portion of the bail 302.

As best seen in FIG. 13, the slotted shaft 320 includes a rectangular block 321 having a centrally disposed rectangular openings 323 and pivot pins 326 and 328 on opposite ends. It is preferred that the block 321 and the pins 326 and 328 be of integral construction. The pins 326 and 328 illustrated in FIG. 13, are mounted perpendicular and coplanar to the longitudinal axis of pins 333 and 335, illustrated in FIG. 12. Pins 326 and 328 are rotatably attached to the housing 18 by bushings 327 and 329, respectively. The gears 322 and 324 are fixedly attached to the pivot pins 326 and 328, respectively.

The second or rearward gimbal assembly 310 includes an arcuate bail 312 and a slotted shaft 360. The bail 312 cooperates with and is mated with the bail 302, and the shaft 360 cooperates with and is mated to the shaft 321. The bail 310 terminates in a pair of gear portions 315 and 316, which are preferably spur gears. Pivot pins 372 and 374 are fixedly attached to the gear portions 315 and 316, respectively. The pins 372 and 374 are mounted to the housing 18 within bushings 373 and 375, respectively, such that the longitudinal axes of pins 372 and 374 are parallel with the longitudinal axis of pins 333 and 335. The gears 315 and 316 of the bail 312 mate with gears 305 and 306 of the bail 302, respectively.

The slotted shaft 360 includes a rectangular block 361 having a centrally disposed opening 363 and pivot pins 366 and 368 on opposite ends. It is preferred that the block 361 and the pins 366 and 368 be of integral construction. The slotted shaft includes gears 362 and 336, which are preferably spur gears. The gears 362 and 336 are attached to pivot pins 366 and 368, respectively. The pins 366 and 368 are mounted to the housing 18 within bushings 367 and 369, respectively, such that the rearward shaft 360 is parallel to the forward shaft 320 and gears 362 and 336 mate with gears 322 and 324, respectively.

Relative movement between the gears 315 and 316 and gears 305 and 306 provides rotational movement about the pitch axis of the actuator 300. Relative movement between the gears 322 and 324 and gears 362 and 336 provides rotational movement about the yaw axis of the actuator 300.

The actuator 300 has biordinate roll axes which are provided by a rotatable shaft 380 and a rotatable rod 390. The rotatable rod 390 is disposed within the shaft 380. It is preferred that shaft 380 is integral with a bridge 381. The bridge 381 includes a slot 381A for receiving the bail 312. The bridge 381 is slightly rotatable (approximately 5 to 10°) about a bushing 393 with respect to a clevis 382. Relative rotation between the clevis 382 and the bridge 381 is described below. The clevis 382 is pivotally mounted to the block portion 361 of shaft 360 about pivot pins 383 and 384. As shaft 380 is rotated, rotational movement is transmitted to the clevis 382, and the shaft 360, causing the housing 18 to rotate within the collar 90 (not shown) to provide a first roll axis for the wrist actuator 300.

The second axis of rotation for the wrist actuator 300 is provided along the rod 390. The rod 390 is connected to a yoke 391. The rod 390 and the yoke 391 are preferably of integral construction. The yoke 391 is pivotally connected to a first four-prong cross pin 364 at a first axis 364B. A second axis 364A of the cross pin 364 is pivotaly connected to a first end of a connector 330. The second end of the connector 330 is pivotally connected to a second four-prong cross pin 365 at a first axis 365A. A second axis 365B of the cross pin 365 is pivotally connected to a yoke 326. The yoke 326 is connected with an output rod 350. The yoke 326 and the output rod 350 are preferrably of integral construction. The connector 330, the cross pins 364 and 365 and the yokes 391 and 326 form a pivoting arrangement. Bearings 392 and 393 are mounted within the bridge 381 and rotatably engage the rod 390.

A second or forward clevis 356 is pivotally connected to the forward slotted shaft 320 about pivot pins 357 and 358 mounted on the outer surface of the block section 321. The clevis 356 is pivotally connected to a second or forward bridge 352 at a bushing 355. The second bridge 352 includes bearings 351 and 359. The bearings 351 and 359 rotatably engage the rod 350. Relative rotation (approximately 5 to 10°) between the clevis 356 and the bridge 352 is described below. The clevis 356 includes a slot 352A for receiving the forward bail 302.

As illustrated in FIG. 13, friction pads 353 and 354 are mounted to interior surfaces of the slot 352A of the forward bridge 352. In a similar manner, friction pads 388 and 389 are mounted to interior surfaces of of the slot 381A of the rearward bridge 381. When the wrist actuator 300 is positioned in a compound pitch-yaw rotation, the bail 302 is freed against the friction pads 353 and 354, causing the bridge to rotate slightly with respect to the clevis 356. Likewise, compound pitch-yaw rotation forces the bail 312 against the friction pads 388 and 389 causing the bridge 381 to rotate slightly with respect to the clevis 382.

Rotation of the rod 390 is transmitted through the yokes 391 and 326 and the connector 330 to the output rod 350. The output rod 350 rotates within bearings 351 and 359.

The wrist actuator 155 of the present invention provides a joint capable of three degrees of freedom. The mechanical joint of the actuator provides singularity-free motion, high precision and back-drivability. The use of spur gears provides a joint having a high mechanical efficiency.

Although the present invention has been described with reference to preferred embodiments, workers skilled in the art will recognize that changes may be made in form and detail without departing from the spirit and scope of the invention.

What is claimed is:

1. A mechanical joint comprising:
   housing means having an open interior portion and open at both a top and a bottom end;
   a first and a second gimbal assembly rotatably mounted within the interior portion of the housing means each gimbal assembly having means for transferring motion to the other gimbal assembly;
   drive means operatively connected to the housing for effecting selective movement of the first and second gimbal assemblies;
   rotation means connected to the first gimbal assembly for transmitting rotational motion to the housing means; and
   output means fixedly connected to the second gimbal assembly for transmitting the desired motion of the mechanical joint.

2. The mechanical joint of claim 1 and further including a second rotation means disposed within and rotatable with respect to the first rotation means for transmitting rotational movement to the output means.

3. The mechanical joint of claim 2 wherein each gimbal assembly comprises:
   a slotted shaft rotatably mounted to the housing means and perpendicularly to the longitudinal axis of the housing means;
   a bail having means for transmitting motion to another bail and rotatably mounted to the housing means and perpendicularly to the slotted shaft and said means for transmitting motion being disposed coplanar with the shaft;
   a clevis having a first and second end pivotally connected at the first end to the slotted shaft and perpendicularly to an axis of the shaft;
   wherein the first and second gimbal assemblies being disposed in close proximity to each other such that the slotted shafts are parallel and coplanar and in such a manner that rotational movement of one slotted shaft is transmitted to the other slotted shaft and rotational movement of one bail is transmitted to the other bail.

4. The mechanical joint of claim 3 and further including:
   first bridge means rotatably connected to the second end of the clevis of the first gimbal assembly and including a slot, the bail of the first gimbal assembly extending through the slot;
   second bridge means rotatably connected to the second end of the clevis of the second gimbal assembly and including a slot for receiving the bail of the second gimbal assembly; and
   wherein the rotation means connected to the first gimbal assembly includes a rotatable shaft fixedly connected to the second bridge means.

5. The mechanical joint of claim 4 wherein the second rotation means comprises a rotatable rod pivotally connected to the output means about two perpendicular axes, the rotatable rod being contained within and rotatable with respect to the first rotation means and the second bridge means, and the output shaft being contained within and rotatable with respect to the first rotation means and the second bridge means.

6. The mechanical joint of claim 1 wherein the housing includes a longitudinal axis and wherein each gimbal assembly comprises:
   a shaft rotatably mounted to the housing means perpendicularly to the longitudinal axis of the housing means;
   a bail having means for transmitting motion to another bail and rotatably mounted perpendicularly to the shaft within the housing means and said means for transmitting motion being disposed coplanar with the shaft;
   a clevis having a first and a second end being pivotally connected at the first end to the shaft perpendicularly to an axis of the shaft and slidably connected at the second end to the bail; and
   wherein the first and second gimbal assemblies being disposed in close proximity to each other such that the shafts are parallel and coplanar with respect to each other and in such a manner that rotational movement of one shaft is transmitted to the other shaft and rotational movement of the bail of the first gimbal assembly is transmitted to the bail of the second gimbal assembly.

7. The mechanical joint of claim 6 wherein each bail is arcuate.

8. The mechanical joint of claim 7 wherein the surface of each bail closest to its respective shaft includes a groove which receives a cam follower on the second end of its respective clevis.

9. The mechanical joint of claim 6 wherein each shaft of the first and second gimbal assemblies includes a pair of bearings fixedly mounted on opposite ends of the respective shafts, and gears mounted on the shafts spaced from ends of the shaft so as to provide shaft stub portions for mounting to the housing means, and the gears of one shaft being in cooperative engagement with the gears of the other shaft.

10. The mechanical joint of claim 9 wherein the means for transmitting motion to another bail includes first and second gear at terminal ends of the bail and a pivot pin fixedly attached to each gear proximate the center of each gear, each bail being pivotally mounted to the housing means on its respective pivot pins, the gear of one bail being in cooperative engagement with the gear of the other bail.

11. The mechanical joint of claim 9 wherein the gears mounted on the shafts are spur gears.

12. The mechanical joint of claim 6 wherein the means for transmitting motion to another bail includes first and second gear portions at terminal ends of the bail and a pivot pin fixedly attached to each gear portion proximate the center of each gear portion, each bail being pivotally mounted to the housing means on its respective pivot pins, the gear portions of one bail being in cooperative engagement with the gear portions of the other bail.

13. The mechanical joint of claim 12 wherein the gear portions are set at an out of phase relationship with respect to a cooperative gear portion.

14. The mechanical joint of claim 12 wherein the gear portions are spur gears.

15. The mechanical joint of claim 6 and further including a yoke and wherein the output means is connected to a first end of the yoke, and the yoke being fixedly connected at a second end to the second end of the first clevis.

16. The mechanical joint of claim 6 wherein the rotation means comprises a rotatable drive shaft fixedly connected to the second end of the second clevis so that the drive shaft is perpendicular to the axes of the shaft of the first and second gimbal.

17. The mechanical joint of claim 16 wherein the drive shaft is fixedly connected to the second clevis by a pair of bridge members, fastened at a first end to the second end of the clevis and fastened at a second end to the drive shaft.

18. The mechanical joint of claim 6 wherein the drive means comprises a first and a second push/pull rod, each push/pull rod independently acting on the collar means, the first push/pull rod connected at a point on the outer surface collar means coaxially with the axis of the shaft of the second gimbal assembly, the second push/pull rod connected to the collar means at a point on the collar means coaxially with an axis of the means for transmitting motion of the second gimbal assembly.

19. The mechanical joint of claim 18 and further including a link pivotally connected at a first end to each push/pull rod and a ball joint assembly pivotally connected between a second end of the link and the collar means.

20. The mechanical joint of claim 6 wherein the drive means comprises a first and a second chain, each chain independently and selectively drivable, the first chain being connected at two points on the collar means along the axis of the shaft of the second gimbal assembly and the second chain being connected at two points on the collar means along an axis of the means for transmitting motion of the second gimbal assembly.

21. The mechanical joint of claim 6 and including electrical conduit means for providing an electrical energy proximate the output means, the conduit means being routed within the housing, and forming a first and a second supply conduit supply portion along an outer surface of each bail such that the conduit means does not interfere with the rotation of the mechanical joint.

22. The mechanical joint of claim 1 and further including:
- collar means in rotatable cooperation with the housing means, wherein the drive means is connected to the collar means; and
- wherein the housing means comprises a cylindrical wall having both top and bottom ends open.

23. The mechanical joint of claim 22 and further including a ring bearing disposed between the housing means and the collar means to permit the housing means to freely rotate with respect to the collar means.

* * * * *